R. McA. LLOYD.
AUTOMOBILE CHASSIS.
APPLICATION FILED APR. 20, 1908.
930,551.
Patented Aug. 10, 1909.
2 SHEETS—SHEET 2.
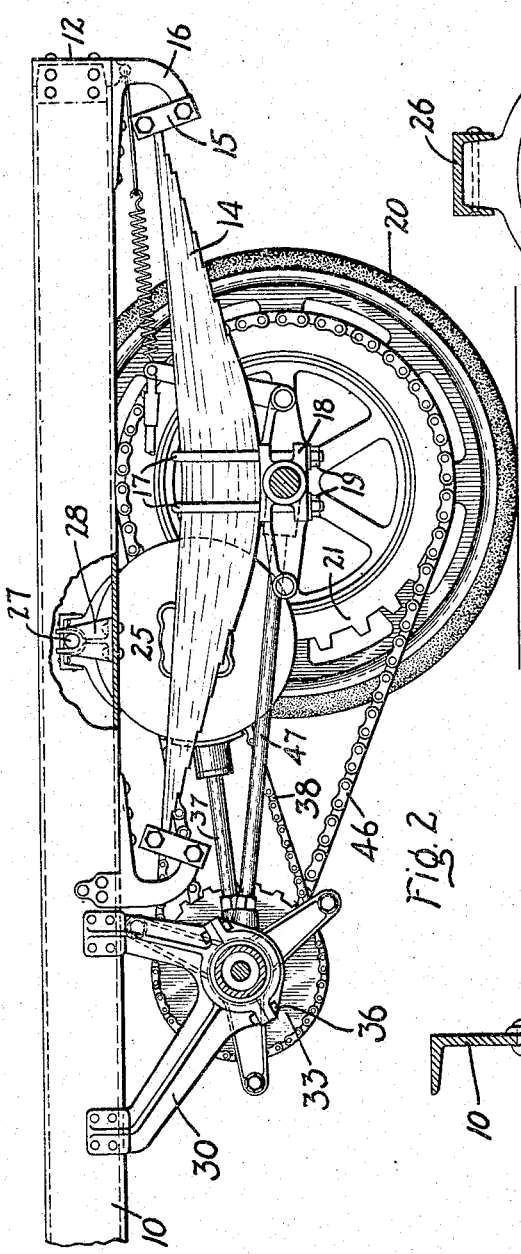
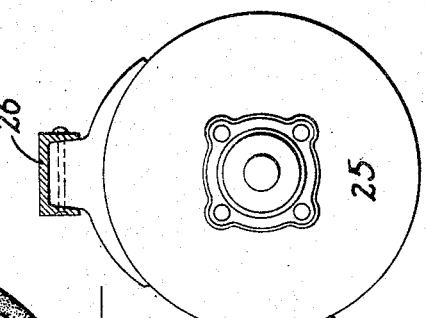
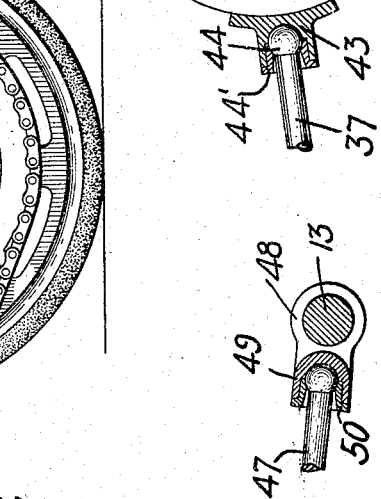
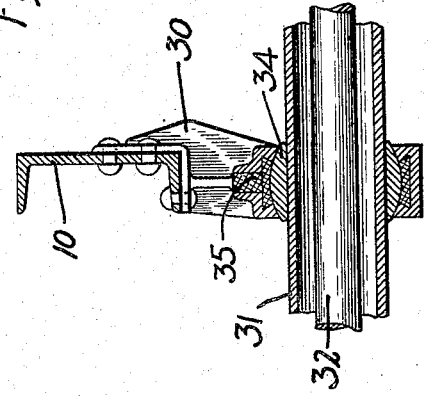
Witnesses:
Lloyd C. Bush
J. Ellis Glenn
Inventor:
Robert McA. Lloyd
By Allen G. Davis
Att'y

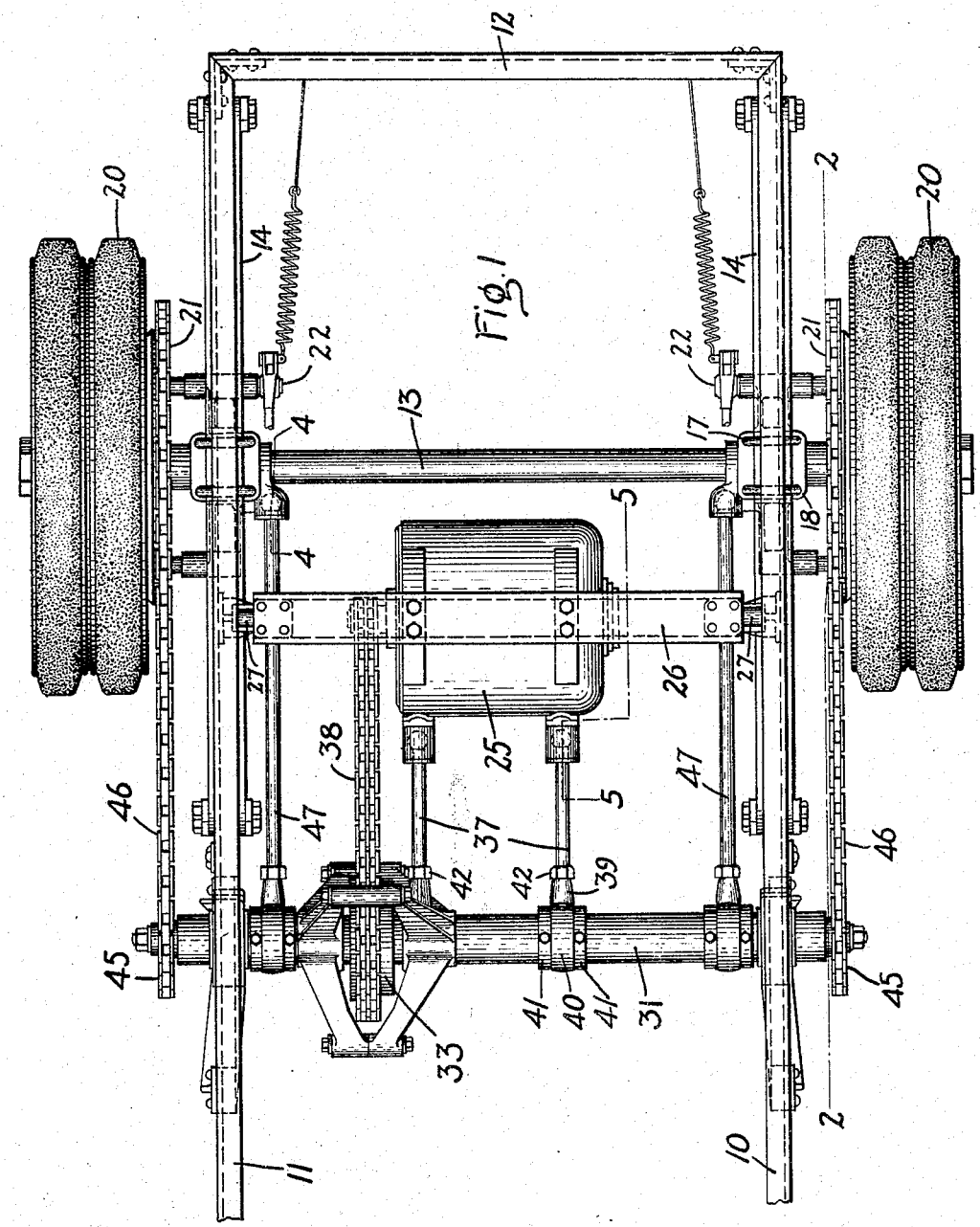

UNITED STATES PATENT OFFICE.

ROBERT McA. LLOYD, OF OYSTER BAY, NEW YORK, ASSIGNOR TO GENERAL VEHICLE COMPANY, A CORPORATION OF NEW YORK.

AUTOMOBILE-CHASSIS.

No. 930,551.　　　　Specification of Letters Patent.　　Patented Aug. 10, 1909.

Application filed April 20, 1908. Serial No. 428,234.

*To all whom it may concern:*

Be it known that I, ROBERT McA. LLOYD, a citizen of the United States, residing at Oyster Bay, county of Nassau, State of New York, have invented certain new and useful Improvements in Automobile-Chassis, of which the following is a specification.

My invention relates to motor vehicles, and particularly to the chassis of vehicles which are driven by electric motors.

It is an object of my invention to provide a new and improved construction of chassis in which the various parts of the driving mechanism, rear axle and frame, are so arranged with reference to one another as to permit easy assembling and disassembling and all necessary adjustability, while at the same time these parts are securely retained in proper relation to one another under all conditions of service.

Other objects of my invention will appear from the following description of a preferred embodiment thereof and from the appended claims.

In the drawings which illustrate one form of my invention, Figure 1 is a plan view, certain parts being broken away, of the rear end of a motor vehicle chassis in which my invention is embodied; Fig. 2 is a side elevation taken on the line 2—2, of Fig. 1, part of the frame of the vehicle being broken away to show the manner in which the motor is supported; Fig. 3 is a vertical transverse cross-sectional view through the side frame of the vehicle showing the manner in which the counter-shaft housing is supported therein; Fig. 4 is a detail view in cross-section on the line 4—4 of Fig. 1; and Fig. 5 is a detail cross-sectional view on the line 5—5 of Fig. 1.

Referring to the drawings, the rear end of the main frame of the chassis is shown as made up of side members 10 and 11 and an end member 12, all of which may be composed of channel iron of the form shown in cross-section in Fig. 3, these being secured together at the corners in any suitable manner. The rear axle of the vehicle, which in this case does not rotate, is shown at 13.
The rear end of the vehicle body is supported upon this axle through springs 14, which at their ends are secured to links 15 pivoted on brackets 16 secured to the side members of the frame, these brackets being of the form shown in the drawing or of any other suitable design. The middle of the springs 14 are secured to the axle 13 by means of straps 17 which pass through blocks 18, secured to said axle, and are provided on their ends with nuts 19. Wheels 20, of any suitable design, are mounted upon the ends of the axle 13 and are arranged for rotation thereon. Secured to the inner face of each of the wheels 20 is a sprocket wheel 21 upon which a driving chain runs, as hereinafter described. Any suitable form of brake may be applied to the wheels 20, a portion of one form being shown in the drawing at 22, which, however, will not be described since it forms no part of my invention. The driving motor 25 is hung from a bar 26 which may be of channel iron of the form shown in Figs. 1, 2 and 5. This bar 26 is provided at its ends with extensions 27 which rest in cavities in brackets 28 secured to the inside of the side members 10 and 11, as clearly shown in the drawings. With this construction the motor is pivotally hung in the frame and can be easily removed therefrom by disconnecting its driving chain and the distance rods, hereinafter referred to, and lifting the bar 26 up and out of the brackets 28.

Mounted in brackets 30, secured to the side members 10 and 11, as best shown in Figs. 2 and 3, is a housing 31 within which is supported a counter-shaft 32. This housing and counter-shaft may be of any suitable and well-known form and is preferably provided with a differential driving mechanism 33 of any suitable kind. The housing 31 is supported in the brackets 30 by means of a ball and socket arrangement which permits easy alinement of the housing in said brackets and prevents straining of the same upon the movement of the side members 10 and 11 with reference to one another, due to racking of the frame. This ball and socket arrangement will be understood from Fig. 3. A sleeve 34 having a spherical outer surface surrounds and is secured to the housing 31, and this sleeve 34 is located in a cavity in the bracket 30 lined with babbitt as shown at 35. With this arrangement accurate machining of the opening through the brackets 30 is unnecessary, since the internal spherical contour of these holes is given by the babbitted lining which is cast therein after the parts are assembled. The brackets 30 being made in two parts bolted together by bolts 36 as shown in Fig. 2, the sleeve 34 can be clamped therein. Between the housing 31 and the frame of the motor 25 are one or, as in this case, two distance rods 37 by which the position of the motor with reference to the counter-shaft and the tension of the driving chain 38 which runs between the motor shaft and the differential driving mechanism 33 may be adjusted. These distance rods 37 at one end screw into lugs 39 projecting from collars 40 rotatable on the housing 31 but secured from longitudinal movement thereon by fixed collars 41. Lock nuts 42 which screw against the ends of the lugs 39 may be used to insure the distance rods 37 remaining at any effective length to which they are adjusted. The other ends of the distance rods 37 have a pivotal connection with the motor casing, and preferably have a ball and socket connection such as that best shown in Fig. 5. In this construction a cup-shaped member 43 is secured to the outside of the motor casing and the ball-shaped end 44 of the distance rod 37 is maintained in a spherical shaped cavity in the member 43 by means of a nut 44' of the form shown which may be screwed into or be otherwise secured in the cavity of the member 43. Sprockets 45 are secured in any suitable manner to the ends of the counter-shaft 32 and chains 46 connect these sprockets with the sprockets 21 secured to the wheels 20.

In order to control the movement of the axle 13 with reference to the counter-shaft 32 and to provide for the adjustment of the tension in the chains 46, radius rods 47 are provided similar in form to the distance rods 37, above described. The connection between the radius rods 47 and the housing 31 of the counter-shaft may be exactly the same as that of the distance rods 37 with the housing, and in the drawings is so shown. The connection of the other ends of the radius rods 47 with the axle 13 is very similar to that between the ends of the distance rods 37 and the motor casing, as will be apparent from Fig. 4 which shows in cross-section the connection between the rods 47 and the axle. This connection consists of a collar 48 fixed to the axle 13, in any suitable manner, said collar being provided with a lug 49 having a spherical cavity into which fits the ball-shaped end of the rod 47. The nut 50 serves to maintain the end of the rod 47 in the cavity in the lug 49 in the same manner as the nuts 44' act in connection with the rods 37, as shown in Fig. 5.

With the construction above described and shown in the drawings, it is apparent that the motor may be easily removed from the frame simply by removing the nuts 44' and thereby disconnecting the distance rods 37, after which the chain 38 may be removed from the sprocket on the end of the motor shaft without opening the chain. Repairs to the motor are thus facilitated. Any slack which may occur in the driving chain 38 may be easily taken up by adjustment of the distance rods 37, and the tension of the chains 46 may be regulated by adjustment of the radius rods 47. The connections between the ends of these rods and parts to which they are secured are such that no straining or bending of the rods occurs during adjustment. The radius rods 47 insure that the axle 13 can move with reference to the counter-shaft 32 only in the arc of a circle of which the counter-shaft is the center, thereby preventing any change in the tension of the chains 46 as the axle 13 moves with reference to the frame under the influence of uneven places in the road. The connections of the rods 47 with the housing 31 and the axle 13 allow this movement without putting any bending strain upon the parts. The ball and socket mounting of the housing 31 in the brackets 30 permits easy assembling of these parts and insures the mounting of the housing in the frame in the position which it naturally assumes without putting it under any bending strain.

While I have shown but one form in which my invention may be embodied, I do not wish to be understood as limiting myself to this exact construction except as called for by the terms of the appended claims.

What I claim as new and desire to secure by Letters Patent of the United States, is,—

1. In combination in a motor vehicle, a frame, wheels and a wheel axle, springs for supporting said frame on said axle so as to permit it to move both vertically and horizontally with reference to said axle, a motor pivotally hung from said frame, a counter-shaft, a housing therefor arranged to support said countershaft in a fixed position with reference to said frame, a driving chain between said motor and said countershaft, an adjustable distance rod between said motor and said housing for adjusting the position of said motor and thereby regulating the tension in said driving chain, pivotal connections between the ends of said distance rod and the motor and the countershaft housing, driving chains between said countershaft and said wheels, adjustable radius rods between said axle and said housing, and pivotal connections between the ends of said radius rods and the wheel axle and the housing.

2. In combination in a motor vehicle, a frame, wheel and a wheel axle, springs for supporting said frame on said axle so as to permit it to move both vertically and horizontally with reference to said axle, a motor pivotally hung from said frame, a counter-shaft, a housing therefor arranged to support said countershaft in a fixed position with reference to said frame, a driving chain between said motor and said countershaft, an adjustable distance rod between said motor and said housing for adjusting the position of said motor and thereby regulating the tension in said driving chain, a pivotal connection between said distance rod and said housing, a universal connection between said distance rod and said motor, driving chains between said countershaft and said wheels, adjustable radius rods between said axle and said housing, pivotal connections between said distance rods and said housing, and a universal connection between said radius rods and the wheel axle.

In witness whereof, I have hereunto set my hand this 16th day of April, 1908.

ROBERT McA. LLOYD.

Witnesses:
J. HOWARD HANSON,
ELLEN M. CROWE.